United States Patent Office 3,156,526
Patented Nov. 10, 1964

3,156,526
STAINLESS STEEL DECLADDING
Loranus P. Hatch, Brookhaven, James J. Reilly, Bellport, Charles B. Bartlett, West Islip, and Richard Johnson, Shoreham, N.Y., assignors to the United States of America as represented by the United States Atomic Energy Commission
No Drawing. Filed May 3, 1963, Ser. No. 277,964
7 Claims. (Cl. 23—14.5)

This application relates to a process of separating stainless steel from a stainless steel clad body. More particularly it relates to a process for the separation of stainless steel cladding from the core of a nuclear fuel element.

Nuclear fuel elements having fissile fuel bearing cores clad with stainless steel are widely used in commercial power reactors. In the normal course of events after such stainless steel clad elements have been used in a reactor for a predetermined length of time they are replaced. The spent fuel elements are then reprocessed to recover the fertile fuel contained therein. In the reprocessing procedures the cladding must be removed from the fuel element, or otherwise dissolved or disintegrated in order that the fertile fuel contained in the core will be exposed for recovery.

Among the proposed processes used in the removal of the stainless steel cladding from the core of a fuel element is a process known as the "Sulfex Process." This process involves the use of sulfuric acid to dissolve the stainless steel cladding. It has an advantage in that it results in a greatly reduced volume of radioactive waste which must be permanently stored. However, the "Sulfex Process" has one great disadvantage, it has a high corrosive action on containers. This has been a limiting factor for the extensive use of this process. Conventional container vessels when tested for use in the proposed "Sulfex Process" have been found to corrode and crack within a short period of time thus rendering the process uneconomical.

It is an object of this invention to provide an efficient economical process for removal of stainless steel from stainless steel clad bodies.

Another object of this invention is to provide an efficient, economical process for the decladding of stainless steel from stainless steel clad nuclear fuel elements.

A further object of this invention is to provide an efficient economical process for recovering fertile fuel from stainless steel clad nuclear fuel elements wherein the clad element is decladded and thereafter the fertile fuel is recovered, with the decladding and recovery operations being carried out in the same reactor vessel.

Other objects of this invention will be obvious, and will in part appear hereinafter.

We have unexpectedly discovered that stainless steel cladding can readily be decladded from stainless steel bodies by intimately contacting stainless steel clad bodies with a gaseous stream of a decladding mixture composed of gaseous oxygen containing solid particles having metal fluorides contained therein, i.e., aluminum fluoride particles, at temperatures ranging from about 675° to about 750° C. The oxygen in the decladding mixture being employed both as the carrying medium for the particles contained in the mixture as well as a reactant in the process for effectuating the decladding. The decladding progresses at such a rapid rate in our novel process that the decladding actually progresses in many cases especially in the preferred embodiment of our invention by exfoliating layers of stainless steel oxide from the stainless steel clad bodies. The stainless steel clad bodies which can be processed in our novel process may be bodies composed entirely of stainless steel, i.e., bars of stainless steel or they may be bodies having a stainless steel cladding or skin, i.e., stainless steel clad uranium bearing nuclear fuel elements.

We have found that our novel process is ideally suited to and preferentially carried out in a fluidized bed with a bed made up of particles containing metal fluoride solids and the gaseous oxygen being utilized as the fluidizing medium for the bed. The use of fluidizied beds per se is well known to those skilled in the art and need not be explained or further elaborated upon in this application except for those explanations given herein to more adequately explain our novel process.

Those skilled in the art are well aware of the fact that very little oxidation of stainless steel will occur merely by contacting the stainless steel bodies with oxygen alone at the temperatures employed in our process. Further it is not fully understood by the inventors why the presence of metal fluoride solids with oxygen so greatly enhances the rate of attack of the oxygen on the stainless steel cladding to give the beneficial effects achieved by our novel process.

The amount of metal fluoride solids that must be present in the particles contained in the mixture can vary over a wide range from an amount ranging from below one percent to about 100 percent by weight based on the total weight of the particles used in the mixture. However it should be noted that particles of metal fluorides such as aluminium fluoride etc. tend to sinter and form cakes when they are used in concentrations above about 10 percent by weight of the total weight of the particles used in the mixture at the temperature utilized in our novel process.

In the preferred embodiment of our invention, a stainless steel clad body such as a whole stainless steel clad uranium bearing nuclear fuel element is immersed in a fluidized bed, whose bed portion contains about one percent by weight based on the total bed weight of aluminum fluoride solids which solids are capable of being passed through a number 325 mesh/inch screen, the remainder of the bed being made up of aluminum oxide particles which aluminum oxide particles are all capable of passing through a 40 mesh/inch screen, ⅓ by weight of the particles being incapable of passing through a 60 mesh screen, ⅔ by weight of the particles being incapable of passing through a 90 mesh/inch screen and none of the aluminum oxide particles being capable of passing through a 120 mesh/inch screen. Activating the bed by intimately contacting and fluidizing the bed particles with gaseous fluorine by passing fluorine through the bed at a superficial velocity of about 0.6 ft. per second while regulating the bed at a temperature ranging from about 400° C. to about 450° C. for a period of up to about ½ hour, thereafter fluidizing the bed and intimately contacting the element immersed therein with gaseous oxygen while regulating the bed at a temperature ranging from about 675° C. to about 750° C. until the desired degree of decladding is achieved. Longer fluorination periods can be utilized but are not considered beneficial.

The activation of the bed particles by the passage of fluorine through the bed can be done either prior to or after the element has been immersed in the bed. In point of fact the bed containing the metal fluoride solids does not need to be fluorinated prior to the use of the metal fluoride particles in combination with gaseous oxygen to effectuate the decladding of stainless steel by use of our novel process. However the activation of the bed particles with fluorine as disclosed in the preferred embodiment of our invention approximately doubles the rate of oxidation obtained as compared to that obtained when our novel process is employed without such prior fluorination of the bed. Our process is not to be construed as limited to the embodiment wherein the bed is activated with fluorine prior to the oxidation step of our novel process since our process is also very effective in achieving the decladding of stainless steel claddings from stainless steel clad bodies even when the bed is not first activated by the passage of fluorine through the bed prior to the oxidation and conceivably there are many situations in which our process can be employed in which passage of fluorine through the bed would be undesirable, i.e., where a reactor vessel is employed which would easily be corroded by contact with fluorine at the temperature employed in our process.

The gaseous fluorine employed in the practice of our invention is preferably a mixture of fluorine and an inert gas such as argon in a mixture such that the fluorine makes up about 25 percent of the total volume of the gas employed during the fluorination steps found useful in our invention. Of course pure fluorine can be employed in the practice of our invention but because of its high degree of reactivity it should be diluted with an inert gas for the sake of safety. In general it has been found preferable to fluidize the particles of the bed at a low magnitude of bed expansion during both the fluorination and oxygenation steps found useful in our novel process.

The oxidation of the element in accordance with our novel process can be carried out with pure oxygen or with any gaseous mixture containing oxygen and gases which are chemically compatible with our system such as atmospheric air. However the rate of oxidation of the stainless steel cladding increases with the proportion of oxygen contained in the oxidizing gas and in the preferred embodiment of our invention we use pure gaseous oxygen. During the oxidation step when temperatures below 675° C. are employed the rate of oxidation is too low rendering the process uneconomical and at temperatures above 750° C. the aluminum fluoride particles contained in the bed tend to sinter and cake reducing the efficiency of the process.

The point at which the contacting of the body with the decladding mixture is determined to be complete of course will depend on the purpose of the user of the process. For example, if the element in the bed contains a known weight of steel to be decladded, the element can be continuously weighed during the oxidation step and when the desired weight loss is achieved the processing can be discontinued. When it is desired to recover uranium from a uranium bearing stainless steel clad nuclear fuel element all one need do is wait until the steel cladding is completely decladded or sufficiently decladded so that the uranium contained therein is adequately exposed for further recovery thereof by conventional uranium recovery processes. When our process is employed to declad stainless steel clad uranium bearing nuclear fuel elements, especially when the preferred embodiment of our invention is employed, the steel cladding often splits, perforates or ruptures during the decladding leaving the uranium contained in such elements adequately exposed for immediate recovery without further oxidation of the element being required.

In the preferred embodiment of our invention the bed is fluidized by the passage of pure oxygen through the bed at a superficial velocity of about 0.7 ft./sec. while maintaining the bed temperature at about 700° C. until the desired degree of decladding is achieved.

In the preferred embodiment of our invention after a stainless steel clad uranium bearing nuclear fuel element has been decladded, so that the uranium contained therein is adequately exposed so that it can be recovered the passage of oxygen through the bed is stopped and gaseous fluorine is then passed through the bed and the exposed uranium in the reactor vessel is contacted with the fluorine gas in substantially the same manner and under the same conditions as were employed in the initial step of the preferred embodiment of our novel process wherein the bed particles were activated by contact with fluorine gas. The passage of fluorine through the bed during this uranium recovery step is carried out until the uranium contained in the reactor vessel is converted to uranium hexafluoride and the resulting product, gaseous uranium hexafluoride which evolves from the reactor vessel is passed through filters to remove any particulate matter which may be entrained therein and is thereafter condensed and further treated by conventional means well known to those skilled in the art to recover the uranium therefrom.

Of course after the stainless steel cladding has been decladded from and/or the uranium is adequately exposed by treating a stainless steel clad uranium bearing nuclear fuel element by means of our novel process any conventional uranium recovery step or process can be employed to recover the exposed uranium. However, for the sake of economy, simplicity and ease of operation in the preferred embodiment of our invention the exposed uranium is recovered by means of passage of gaseous fluorine through the bed. Since in the preferred embodiment of our invention the stainless steel clad element need not be present in the bed while the bed is activated by fluidization of the bed with gaseous fluorine, a further advantage is gained when the uranium is recovered by fluidizing the bed with fluorine gas and thereby recovering the exposed uranium, in that the bed particles are activated and another element can be immediately immersed in the bed and decladded by the oxygenation step of our novel process. It is readily apparent that not only is our process efficient but great economies are gained when it is employed to recover uranium from stainless steel clad uranium bearing nuclear elements since it permits the reuse of a single reactor vessel and bed to recover the uranium from many nuclear fuel elements which elements can be sequentially processed in the same vessel and bed thus sharply reducing the amount of radioactive waste evolved in the reprocessing of the elements.

The composition of the bed particles can vary widely provided sufficient amounts of metal fluoride particles are present in the bed to accelerate the oxidation of the stainless steel decladding on the body which is being treated in our novel process. The size of the particles can vary widely since the chief limitation on the size of such particles is that they be capable of being fluidized. The size range of such fluidizable particles is well known to those skilled in the art and our invention is not to be construed as limited to any specific sized particles.

Particles in the bed other than the necessary metal fluoride particles can be any other class of fluidizable particles which will not interfere with the operation of our novel process. Such other type particles should be chemically and thermally compatible with the system employed. Our invention is not to be construed as limited to any particular particles for use in conjunction with the metal fluoride particles to form the bed since many particulate materials having the requisite chemical properties and thermal compatibility are well known to those skilled in the art and by use of simple experimental runs one skilled in the art can determine whether or not a particular class of particles can be used if there is doubt concerning the advisability of employing a particular particle material.

In the preferred embodiment of our invention we employ aluminum fluoride particles together with aluminum oxide particles. The aluminum oxide particles are substantially stable in both fluorine and oxygen at the temperatures employed in our process.

Construction of fluid bed reactors and the operation thereof are well known to those skilled in the art. Those skilled in the art readily realize that ratio of the amount of bed material to body to be decladded in our novel process will of course be dependent upon the geometric configuration and shape of both the reactor vessel and the element to be decladded. Our invention is not to be construed as limited to any particular size or shape of reactor vessel and/or stainless steel clad body. Illustrative of the ratios of the weight of bed material to the weight of the element that have been found useable in our invention range from between about 25:1 to about 5:1, however such a range of ratios cannot be construed as limiting the scope of our invention because it is merely representative of the range found useable by the inventors and permissible variations inherently permitted by our process will permit these ranges to be exceeded by wide margins.

The following example is given merely to illustrate the practice of our novel invention and in no way is to be construed as limiting the scope of our invention.

EXAMPLE

Apparatus

The fluidized bed reactor vessel was constructed of nickel. It had a lower section 2" I.D. approximately 36" long, the upper section which served as a particle de-entrainment chamber is 4" in I.D. and 12" long. The reactor is fitted with three thermo-couple wells which enter through a flange at the top of the vessel. The bottom of the reactor was conical in shape and was fitted with a ball check which prevented bed material from running out of the reactor and also improved distribution of the fluidizing gas. The bottom of the cone is attached to ½" nickel tubing through which the fluidizing and reactant gases are introduced. Off gases are exited through ½" tubing attached to the top flange of the reactor. Both the reactor and other system components were heated by Nichrome wire resistance heating circuits. The off-gas line was connected to a packed bed filter of granular aluminum oxide which served to remove entrained particles from the gas stream. After passing through the filter, the off-gas line was split into two sections. One section vented directly to the atmosphere and was used during oxidation only, the other section was used during fluorination and was connected to a $UF_6$ condenser cooled by Dry Ice and trichlorethylene ($-60°$ C.). Exit gases from the condenser were conducted in ½" line to a caustic scrubber in which excess fluorine was removed from the off-gas stream. Inert gases which passed through the scrubber were vented to the atmosphere.

Reagents and Sample

Sample—A section of Yankee fuel element, 12" long, ½" in diameter, sealed at both ends (this sample contained ~125 gms. of $UO_2$ in a 304 stainless steel cladding ~15 mils in thickness), total weight 147 gms.

Fluid bed material—2000 gms. of R.R. Alundum ($Al_2O_3$) from Norton Co., —40 mesh/inch+120 mesh/inch particle size Aluminum fluoride ($AlF_3$)—25 gms., powdered, technical grade, Amend Drug and Chemical Co., 325 mesh/inch particle size Nitrogen ($N_2$)—prepurified Oxygen ($O_2$)—Dry Fluorine ($F_2$)

Argon (Ar)

Procedure

With the top flange of the reactor removed, 2000 gms. of bed material and 25 gms. of $AlF_3$ were introduced into the reactor. The fuel sample was fixed by means of Nichrome wire to one of the thermocouple wells attached to the top flange. The sample was positioned so that when the top flange and the reactor were reassembled, it was ~8" above the reactor bottom and immersed in the fluidized bed. During assembly the bed was fluidized with nitrogen gas so that the gas passed up through the bed at a superficial velocity of ~0.6 ft./sec. When fluidized the bed offers no resistance to the immersion of the thermocouple sample assembly. Fluidization with $N_2$ was continued and the reactor heated to 450° C. while the off-gas lines and filter were heated to 100° C. At 450° C. the fluidizing gas mixture was converted to 25% fluorine and 75% argon and was passed through the bed at a rate of 0.6 ft./sec. This phase of the procedure was continued for ½ hour, after which the fluorine feed was shut off and $N_2$ passed through the reactor which was continued while raising the temperature to 700° C. At this point 100% oxygen was introduced into the reactor and passed through the bed at a superficial velocity of 0.7 ft./sec. Off-gas lines and the filter were not heated during the oxidation cycle. The oxidation was continued 4½ hours. It was during this period that stainless steel cladding of the fuel element sample was removed. After oxidation, the reactor was cooled to 450° C. and a mixture of 25% fluorine and 75% Argon was passed through the reactor for 1 hour at a superficial velocity of ~0.6 ft./sec. During this period, uranium was removed from the reactor as $UF_6$, passed through the filters and condensed in the cold trap ($-60°$ C.). During the final fluorination the off-gas lines were heated to 100° C. (to prevent $UF_6$ condensation and line plugging) while the filter is heated to 400° C. so that any uranium in the filter is fluorinated and removed as $UF_6$. After this final fluorination, the reactor was cooled and U was recovered from the cold traps by washing.

Results

The reactor was disassembled and the bed material removed. The bed was free flowing, somewhat darker than its original white color, and contained ~350 [1] p.p.m. of uranium. Associated with the bed were thin flakes of unreacted stainless steel cladding material, but no unreacted uranium oxide was discernible. A total of 79.6 gms. of uranium was recovered from the uranium hexafluoride cold trap.

Thus it is readily apparent that our invention provides an economical, safe, easy to operate process for recovering uranium from steel clad uranium bearing nuclear fuel elements. In this example we have employed a reactor vessel constructed of nickel, however, due to the corrosive effects resulting from use of our process it would be advisable to use a more corrosion resistant material such as Inconel in the construction of reactor vessels in which our process is to be employed on a commercial scale. The term screen size as employed in this application refers to U.S. Standard Sieve Series (1940).

Having described our invention, what we claim as new and desire to secure by Letters Patent is:

1. A process for decladding stainless steel cladding from stainless steel clad bodies comprising:
    (a) immersing said steel clad bodies in a fluidized bed;
    (b) said bed being composed of about one percent by weight of fine particles of aluminum fluoride based upon the total bed weight;
    (c) the remainder of said bed being made up of fine particles of aluminum oxide;
    (d) fluidizing said bed containing said body with an oxygen containing gas while maintaining the temperature of said fluidized bed at a temperature ranging between about 675° C. to about 725° C., until the desired degree of decladding is accomplished.

2. The process of claim 1 wherein said steel clad bodies are stainless steel clad uranium bearing nuclear fuel elements.

3. The process of claim 2 wherein the uranium is exposed upon completion of said decladding.

4. The process of claim 3 wherein said exposed uranium is intimately contacted and reacted with gaseous fluorine, thereafter recovering the uranium from the reaction product of said uranium and fluorine.

5. A process for decladding stainless steel claddings from stainless steel clad bodies comprising,
    (a) immersing said steel clad bodies in a fluidized bed
    (b) said bed being composed of about one percent by weight of fine particle of aluminum fluoride based upon the total bed weight

---

[1] Equivalent to 0.7 gm. of uranium.

(c) the remainder of said bed being made up of fine particles of aluminum oxide,
(d) intimately contacting and activating said bed particles by fluidizing said bed with gaseous fluorine while maintaining the temperature of said bed at a temperature ranging from between about 400° C. to about 450° C. for about ½ hour,
(e) fluidizing said bed containing said body with an oxygen containing gas while maintaining the temperature of said bed at a temperature ranging from about 675° C. to about 725° C., until the desired degree of decladding is achieved.

6. The process of claim 5 wherein said body is a stainless steel clad uranium bearing nuclear fuel element.

7. A process for recovering uranium from stainless steel clad uranium bearing nuclear fuel element comprising,
(a) immersing said element in a fluidized bed,
(b) said bed containing about one percent by weight of fine particles of aluminum fluoride based upon the total weight of the bed,
(c) the remainder of said bed being composed of fine particles of aluminum oxide
(d) said bed particles being intimately contacted with, activated and fluidized by passage of gaseous fluorine through said bed for about ½ hour while maintaining the temperature of said bed at a temperature ranging from between about 400° C. to about 450° C.,
(e) fluidizing said activated bed containing said body with an oxygen containing gas, while maintaining the temperature of said bed at a temperature ranging from between about 675° C. and 725° C., until the uranium contained in said element is exposed
(f) fluidizing said bed and intimately contacting and reacting said exposed uranium with gaseous fluorine, while maintaining the temperature of said bed at a temperature ranging from between about 400° C. to about 450° C. until the uranium in said bed is reacted with fluorine, thereafter recovering the uranium from the reaction product of uranium and fluorine gas.

References Cited in the file of this patent

AEC Document TID-7592 (issued November 1960), pp. 44-51.
AEC Document ANL-6596 (1962), pp. 135-148.